Nov. 28, 1933. W. E. MOORE 1,937,065
INDUCTION FURNACE AND METHOD OF OPERATING THE SAME
Filed Oct. 10, 1931   2 Sheets-Sheet 1
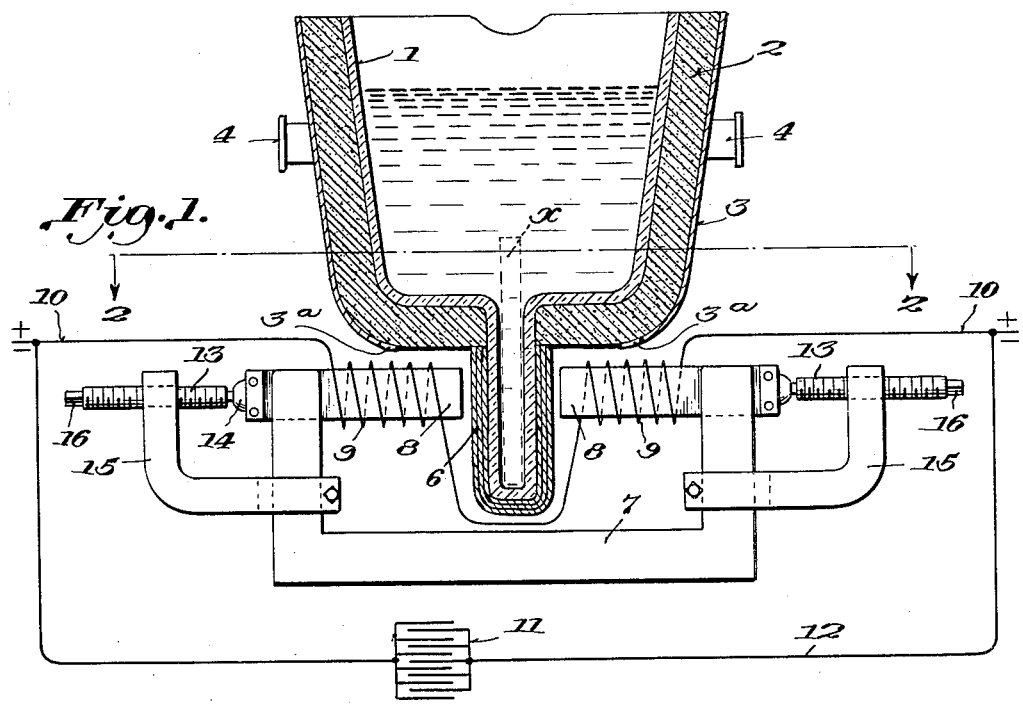

Nov. 28, 1933.     W. E. MOORE     1,937,065
INDUCTION FURNACE AND METHOD OF OPERATING THE SAME
Filed Oct. 10, 1931     2 Sheets-Sheet 2

Inventor
Wm. E. Moore,
By Wm. L. Symons
Attorney

Patented Nov. 28, 1933

1,937,065

UNITED STATES PATENT OFFICE 1,937,065

INDUCTION FURNACE AND METHOD OF OPERATING THE SAME

William Enoch Moore, Pittsburgh, Pa., assignor to Pittsburgh Research Corporation, Pittsburgh, Pa.

Application October 10, 1931. Serial No. 568,130

11 Claims. (Cl. 13—26)

This invention relates to electric furnaces and more particularly to furnaces of the induction type.

Induction furnaces, as heretofore constructed, have usually been one of three broad types, namely, (1) the all iron core furnace comprising a generally horizontal annular channel which holds the molten metal and constitutes a secondary around the closed magnetic circuit; (2) the so-called submerged loop iron core furnace, in which there is a U-shaped loop projecting from the crucible of molten metal through which the iron core extends, such core being excited by a primary inductor coil; and (3) the so-called air core furnace in which the exciting winding or inductor coil surrounds the crucible or is so related thereto as to project the alternating magnetic flux through the body of metal contained therein.

The first of these types is objectionable because of its extremely low power factor; the fact that the annular secondary channel is of fragile refractory material and likely to break and moreover has a large heat radiating surface; the molten metal secondary in the annular channel is apt to rupture at its thinnest section due to magneto-striction or so-called "pinch-effect", when large power and high amperage is applied as, for instance, in rapid heating; and that the furnace cannot be started with a cold charge without first priming it with sufficient molten metal to form a secondary circuit.

The second or submerged loop type of furnace has the advantage of providing a static head of molten metal over the secondary loop, which prevents the loop from rupturing by "pinch-effect". It has been popular for brass and bronze melting, but due to the difficulty of obtaining suitable refractory material of which to construct the submerged loop so as to make possible a reasonable cost of maintenance, this furnace has not been satisfactory for use in larger sizes or in melting metals requiring a higher temperature, such as nickel, chromium, iron or steel. The submerged loop type of furnace is also subject to the same objection as the horizontal ring type, insofar as the problem of cold starting is concerned.

The third or air core type of furnace in which the inductor winding surrounds the open top crucible, is objectionable because, on account of the exceedingly high magnetic reluctance, an abnormally heavy exciting current is required and the furnace works at an abnormally low power factor at ordinary commercial frequencies resulting in exceedingly high heat losses in the inductor and other windings. Moreover, the mechanical structure of the furnace, in which a coil surrounds the crucible, makes it clumsy and awkward to handle, and difficult to tilt for the purpose of pouring. To improve to some extent the power factor and efficiency of such furnaces, it has been proposed to operate them at very high frequencies, but for this purpose, special generators or convertors for high frequency currents are required, and such equipment is expensive, inefficient and troublesome.

It has been proposed to provide partial iron core magnetic circuits in this last mentioned type of furnace in order to somewhat decrease the reluctance, confine and direct the exterior magnetic flux, and increase the efficiency. These magnetic iron cores have been arranged to project up in the crucible from the bottom, or to extend down into the same from the top, but owing to the fact that they are inside of the crucible, such arrangements are undesirable from a practical standpoint, since these cores interfere with the handling of the charge and become unduly heated.

The general object of the present invention is to provide an induction type furnace which shall be free from most of the objections and disadvantages of the three previously known types and their modifications above discussed, and which shall operate at reasonable efficiency and at a relatively high power factor with alternating currents of moderate or of the usual commercial frequencies.

One of the specific objects of the invention is to provide an induction furnace which can be started cold, that is to say, which does not require priming with molten metal.

Another object is to provide an induction furnace in which there are no refractory rings or loops employed; in which the heated refractory crucible may be surrounded by heat insulating material to minimize heat losses, in accordance with the usual practice in other types of furnaces; and which may be enclosed in an iron or steel shell without incurring the usual stray electromagnetic losses.

A still further object is to provide a furnace in which the exciting coil or winding is mechanically free from and unconnected with the crucible, so that the crucible may be conveniently handled, lifted or tilted, as desired.

Heretofore, in constructing induction furnaces of the horizontal channel or submerged loop type, it has been necessary to design the channel or loop so that it will have the proper cross section relative to the power input, for the particular metal being melted, each of such metals having a definite specific conductivity. In order to handle metals of a different specific conductivity, it was necessary to redesign the channel or loop for each case.

Another object of the present invention, therefore, is to provide an induction furnace having means by which the reluctance of the magnetic circuit may be adjusted so as to compensate for the different conductivity of different metals being melted, whereby the load on the inductor coil and furnace power supply may be regulated as required, without modification of the crucible. In other words, I propose to use the same furnace for melting metals of widely different electrical characteristics without making any mechanical change in the structure of the furnace itself, merely by adjusting or varying the magnetic characteristics of the path through which the flux passes. I may accomplish the same purpose however by changing the voltage or intensity of the power supply.

In order that the invention, and the means for carrying the same into effect, may be readily understood, reference is had to the accompanying drawings, forming part of this specification, and illustrating more or less diagrammatically several different embodiments of the invention. In these drawings:

Fig. 1 is a vertical section through one form of the improved furnace, parts being shown in elevation;

Fig. 2 is a sectional plan view thereof substantially on the line 2—2 of Figure 1;

Figure 3:
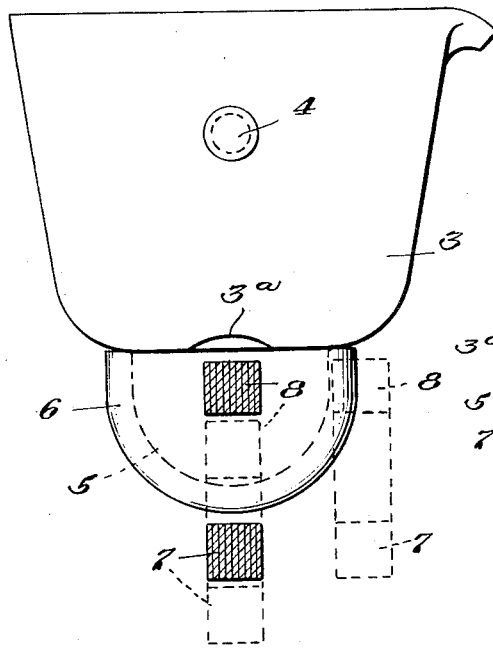
Fig. 3 is a side elevation of the furnace shown in Figure 1 looking in a direction at right angles to that of Figure 1, the magnetic core being shown in section and parts being omitted for the sake of clearness.

Referring to the drawings in detail, and more particularly first to Figures 1 and 2 thereof, my improved furnace comprises a material holding chamber or crucible 1 constructed of suitable refractory material and of any convenient form such as cylindrical or slightly tapered mounted with its axis vertical. Surrounding the crucible 1 is a jacket or a packing of suitable insulating material 2, to prevent excessive heat losses, and this insulating material and crucible may be enclosed in a metallic cage or shell 3, which may be made of iron or steel. Trunnions 4 are preferably secured to the sides of the shell 3 by means of which the furnace may be lifted and tilted for the purpose of pouring the charge. Any other of the well known methods of mounting and tilting the furnace may, of course, be employed.

Projecting from the crucible is a relatively small and thin flat pocket or box 5 communicating at one end with the interior of the crucible and constituting a material melting chamber of the pot type. This pocket or box may project in any direction from the crucible, so long as it is below the normal level of the charge, but I have illustrated it as depending from the bottom of the crucible, as this has been found to be a convenient location. As shown in Figure 2, this pocket or box 5 may have flattened parallel sides. It extends down through the insulating material 2, and the shell 3 is cut away at 3ª to avoid magnetic leakage, as hereinafter described. In order to assist in confining the heat in the pocket or box, I preferably surround it with a layer or wrapping 6 of heat insulating material, such, for example, as asbestos.

I heat the furnace by inducing strong eddy currents in that portion only of the charge which is contained within the pocket or box 5, and to this end, I provide means for concentrating the magnetic flux upon and directing it transversely through this pocket. Thus, because of the comparatively narrow width of this pocket, the magnetic gap is short.

The means for doing this, as shown in Figure 1, comprises a laminated U-shaped core or frame 7 of soft iron or other magnetic material. This frame is disposed in a vertical plane below the furnace, and substantially centrally thereof. Projecting inwardly from the upper end of each leg of the frame 7 toward the box 5 is a laminated pole piece 8. These pole pieces may be interleaved with the frame 7, as shown in Figure 2, or otherwise slidably connected therewith, so that they may be adjusted longitudinally toward and from each other. It will be seen that the frame 7 and pole pieces 8 constitute, in effect, a nearly closed magnetic core having an air gap between the adjacent ends of the pole pieces, and that the pocket or box 5 lies within this air gap.

On the magnetic core above described, and preferably on the pole pieces 8 themselves, are wound inductor coils or exciting windings 9 and these are connected by conductors 10 with a source of alternating current of any usual commercial frequency. The coils are preferably shunted by means of a conductor 12 having therein a static condenser 11, in order to improve the power factor of the apparatus. A rotary or synchronous condenser may also be employed instead, if desired.

Means are provided for adjusting the pole pieces toward and away from the pocket or box 5 in order to vary the length of the air gap and hence the reluctance of the magnetic circuit. The means for doing this, as shown in Figure 1, may comprise screws 13 having a swivelled connection 14 with the respective pole pieces 8, and threaded through brackets 15 secured to a fixed support, as for example, the frame 7 itself. These screws may have cranks formed upon their outer ends or, as shown in the drawings, the ends may be squared, as illustrated at 16, in order to receive a suitable key or wrench by which the screws may be turned. It is obvious that by turning these screws, the air gap may be adjusted, as required. Any other well known means for adjusting the pole pieces may be used.

Owing to the fact that the magnetic core is laminated, it usually will not become excessively hot, and the pole pieces are shielded from the heat of the furnace both by the covering 6 and by the insulation 2. However, if necessary, provision may be made for cooling the magnetic core by means of an air blast or the like.

Similarly, the inductor coils 9, being exposed to the air and substantially shielded from the heat of the furnace, will, at least in the smaller sizes of furnace, not overheat. These coils, however, may be constructed of hollow tubing, if desired, through which cooling water may be circulated in a well known manner.

It will be observed that owing to the relatively low magnetic reluctance of the induction apparatus, and the relatively small amount of magnetic leakage, the power factor will be relatively high, even at commercial frequencies. It will also be appreciated that the concentration of the magnetic flux through the pocket 5 by means of the pole pieces 8 permits the use of the steel shell 3 without materially interfering with the operation of the inductor coils, this shell being, however, preferably cut away as shown at 3ª to minimize leakage of stray flux from the pole pieces.

It will be still further observed that the furnace, as shown, is mechanically independent of the inductor coils and core and may be moved, lifted or tilted, as desired, without disturbing the induction apparatus. The induction apparatus may, however, in some cases, be attached to and movable with the furnace shell.

As explained in the preamble, it is usually necessary to prime an induction furnace with molten metal in order to start it. In my improved construction, however, this is unnecessary. In order to start the improved furnace, I simply place in the pocket 5 a slab or slug X of solid cold metal, as shown in dotted lines in Figure 1. Thereupon, when the current is turned on, eddy currents will be induced in this slab or slug, of sufficient strength to melt the same, and the heat will then be imparted to the rest of the charge. I believe it is broadly new with me to start or to operate an induction furnace by concentrating the magnetic flux upon a small portion only of the charge, as distinguished from the entire mass or bulk thereof.

In melting metals of widely differing electrical conductivity, it is desirable to vary the relation of the magnetic circuit to the charge in order to regulate the load and prevent overheating of the transformer. This may be done either by varying the length of the air gap, by adjusting the pole pieces 8, as described, thus changing the reluctance of the magnetic circuit or by shifting the furnace or magnetic core relative to each other. In Figure 3, I have illustrated, in dotted lines, how the magnetic core 7 and 8 may be shifted either laterally or vertically, so as to vary its relation to the charge contained in the pocket 5. When the core is in full line position, as shown in Fig. 3, the eddy currents induced in the metal in the pocket have all the space between the axis of the core and bottom of the pocket to circulate in. In other words, the "secondary" return circuit is of relatively large cross-section and relatively low resistance. In this case, the currents flowing in such "secondary", and, consequently, the power input to the furnace, are a maximum. As the magnetic core is shifted toward its lower or eccentric position as indicated in dotted lines, it will be seen that the cross-section of this secondary return circuit becomes less and its effective resistance consequently increases, and this results in a reduction in the absorption of power by the furnace.

Thus, when melting metals of higher electrical conductivity, such as copper, the magnetic core may be either shifted to increase its eccentricity, as shown in Figure 3, or the air gap must be increased, so as to avoid overloading. When melting material of lower conductivity, such as nickel or steel, the air gap may be smaller and the magnetic core may be substantially centered upon the pocket.

I believe it is broadly new with me to provide an induction furnace having means by which the induction characteristics can be varied in accordance with the particular metal being treated, in order to regulate the load, as desired.

While in Figures 1, 2 and 3, I have illustrated my improved furnace as of the single-phase type, it is clear that the same principle may be employed in connection with three-phase circuits.

Figure 4:
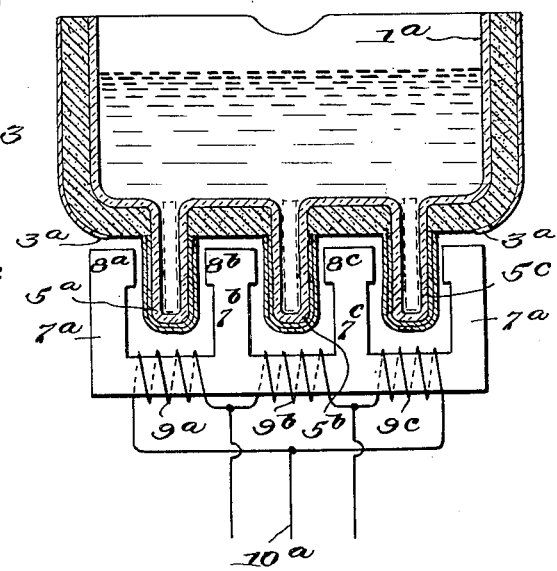
Fig. 4 is a vertical section similar to Figure 1, showing one form of a three-phase furnace constructed in accordance with the invention.

In Figure 4, I have illustrated conventionally one form of three-phase furnace comprising a crucible 1ª having three pockets 5ª, 5ᵇ and 5ᶜ, depending from the bottom thereof. A laminated magnetic core 7ª is provided having a plurality of branches 7ᵇ and 7ᶜ, terminating in pole pieces 8ª, 8ᵇ and 8ᶜ, having air gaps between them, in which air gaps the several pockets are disposed. On the core 7ª is wound a three-phase winding 9ª, 9ᵇ and 9ᶜ, shown as connected in delta and supplied with current from a three-phase circuit 10ª. It is not necessary, however, that the several pockets be parallel, as shown in Figure 4. They may be disposed radially or otherwise.

Figure 5:
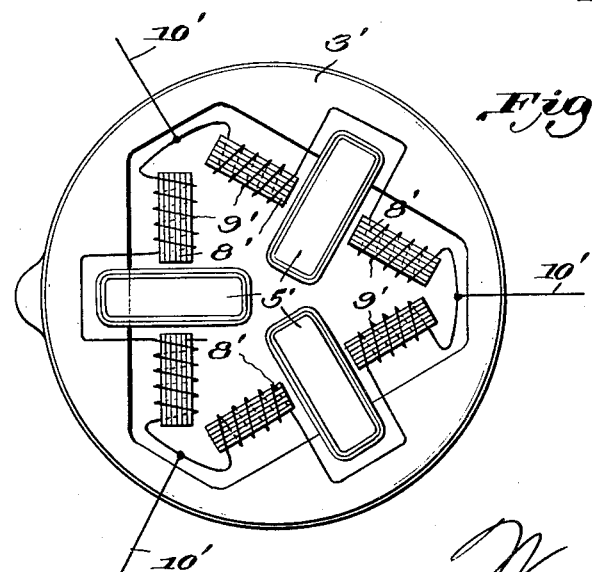
Fig. 5 is an inverted plan view showing a slightly different arrangement of three-phase furnace.

In Figure 5, which is an inverted plan view, I have shown three pockets 5', projecting from the bottom of a furnace 3' and disposed radially about a common center. Associated with each pocket is a magnetic structure 8' which may be similar to the structure 7, 8, shown in Figure 1, and the inductor coils or winding 9' on these magnetic cores are connected to a three-phase circuit 10', as shown. The shell is preferably cut away at 3ª, adjacent the cores, as in Fig. 1. Other arrangements for polyphase circuits may, of course, be employed, and it will be understood that in connection with such arrangements as shown in Figures 4 and 5, the crucibles and magnetic structures may be shifted, as shown in Figure 3, or means may be provided for varying the air gaps, as shown in Figure 1.

While I have shown the inductor or primary coils 9 on the laminated pole pieces 8, I find that on certain arrangements of my invention it is desirable to wind these coils on the bottom leg of the magnetic circuit 7 in Figure 1, in a manner similar to coils 9ª, 9ᵇ, 9ᶜ in Figure 4. At other times, I may find it desirable to wind the exciting coils on the vertical legs connecting the portions 7 and 8 in Figure 1, or on 7ª, 7ᵇ and 7ᶜ in Figure 4. In still other cases I may find it desirable to wind the inductor coil over practically the entire laminated magnetic structure.

In certain arrangements of my invention I prefer to regulate the power input and rate of melting or temperature by regulating the power supply without changing the relation of the furnace and inductor elements as by means of an induction regulator for varying the voltage of the power supply or by means of an adjustable reactor coil, or by means of a field rheostat on the generator supplying the furnace in the usual and well known way.

Other arrangements of this apparatus not here shown will readily be apparent to those skilled in the art, as, for instance, the box 5 may project radially from the sides of the crucible in Figures 1 and 4, or at any angle thereto.

What I claim is:

1. In an induction furnace, a crucible adapted to contain the material to be melted, a relatively thin pocket projecting from said crucible and closed at one end, and means for causing an alternating magnetic flux to traverse said pocket from side to side in the direction of its smallest dimension.

2. In an induction furnace, a crucible adapted to contain the material to be melted, a relatively thin pocket projecting down from and below the bottom of said crucible and closed at its lower end, and means for causing an alternating magnetic flux to traverse said pocket from side to side in the direction of its smallest dimension.

3. In an induction furnace, a crucible adapted to contain the material to be melted, a relatively thin pocket projecting from said crucible and closed at one end, a core of magnetic material having opposed pole pieces, said pocket being disposed between said pole pieces, and means for setting up an alternating magnetic flux in said core.

4. In an induction furnace, a crucible adapted to contain the material to be melted, a relatively thin pocket projecting from said crucible and closed at one end, a core of magnetic material forming a nearly closed magnetic circuit having an air gap, said pocket extending within said air gap, and an inductor coil surrounding said core.

5. A self-starting electric furnace of the induction type comprising a crucible having a closed pocket projecting down therefrom and adapted to receive a solid slug of the material to be melted, and means for inducing in such solid slug eddy currents of sufficient strength to melt the same.

6. The method of starting an electric induction furnace having a crucible provided with a relatively small pocket extending therefrom and communicating therewith which comprises placing in said pocket a solid slug of metal, and then subjecting such slug to the action of an alternating magnetic flux to induce therein currents of sufficient volume to melt the same.

7. The method of operating an electric induction furnace which comprises supporting a small portion of the charge in the form of a relatively thin mass in the solid state connected with the main body of the charge, and causing an alternating magnetic flux to pass transversely through said relatively thin mass from side to side thereof, whereby eddy currents are induced therein.

8. The method of regulating an electric induction furnace having an inductor coil and a core of magnetic material associated therewith for directing the flux through the charge, which method comprises shifting the relative position of the furnace and the core of magnetic material in a direction transverse to the axis of the said core to vary the volume of the currents induced in the charge.

9. The method of regulating an electric induction furnace having an inductor coil and a core of magnetic material associated therewith for directing the flux through the charge, which method comprises shifting the relative position of the furnace and the core of magnetic material in a direction transverse to the axis of the said core to vary the effective resistance of the secondary circuits in that portiton of the charge in which currents are induced.

10. An electric induction furnace comprising a material holding chamber of relatively large capacity, a pot-type material melting chamber of relatively small capacity projecting down from and located wholly below said material holding chamber and communicating at its upper end only therewith, and an inductive energizing coil adjacent but wholly outside of said material melting chamber.

11. The method of operating an electric induction furnace which comprises separating a small portion of the metallic charge in the form of a relatively thin mass in contact at one end only with the main body of the charge, and causing an alternating magnetic flux to pass transversely through such separated relatively thin mass, whereby eddy currents are induced therein and sufficient heat generated to melt the entire charge.

WILLIAM ENOCH MOORE.